United States Patent Office 3,289,727
Patented Dec. 6, 1966

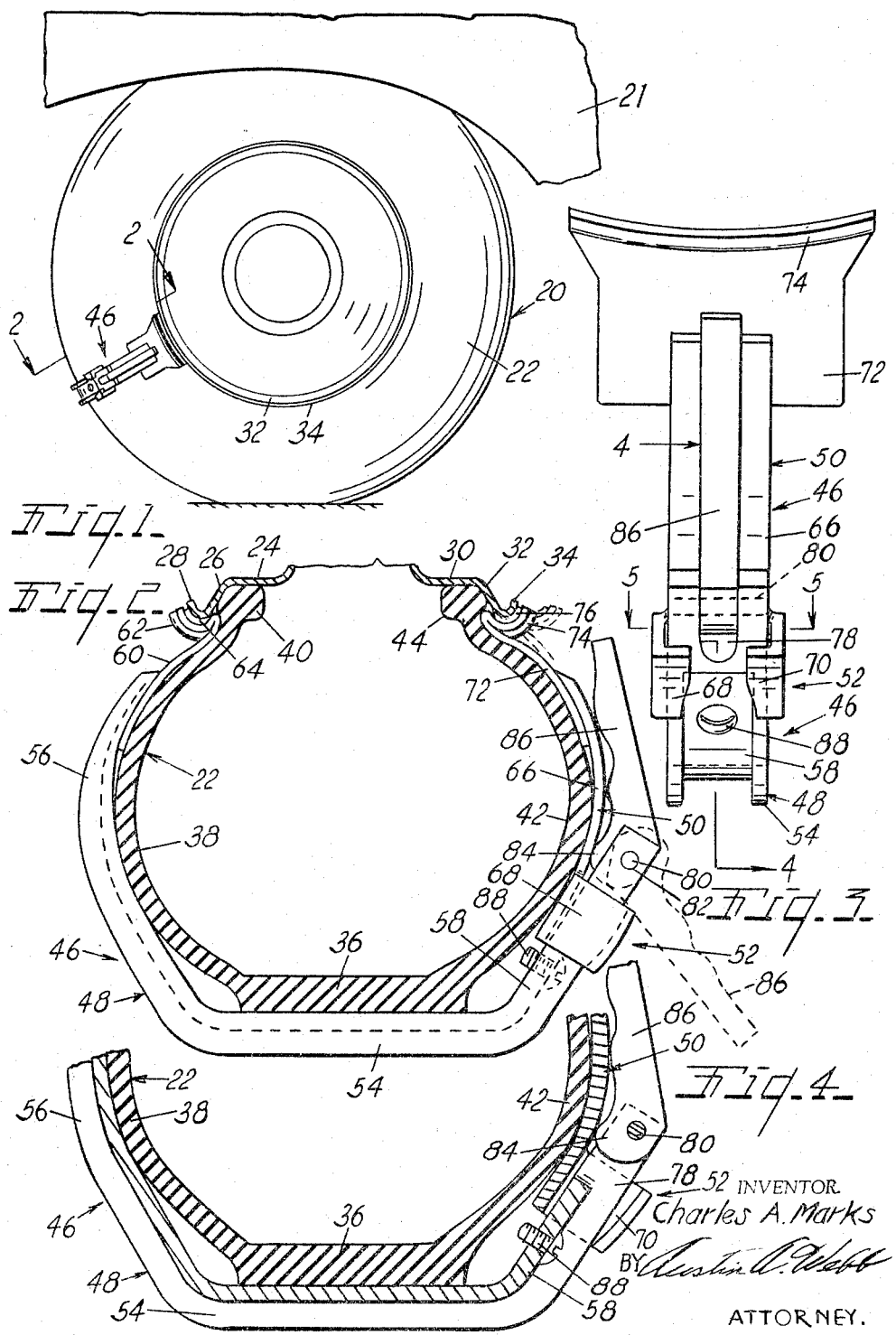

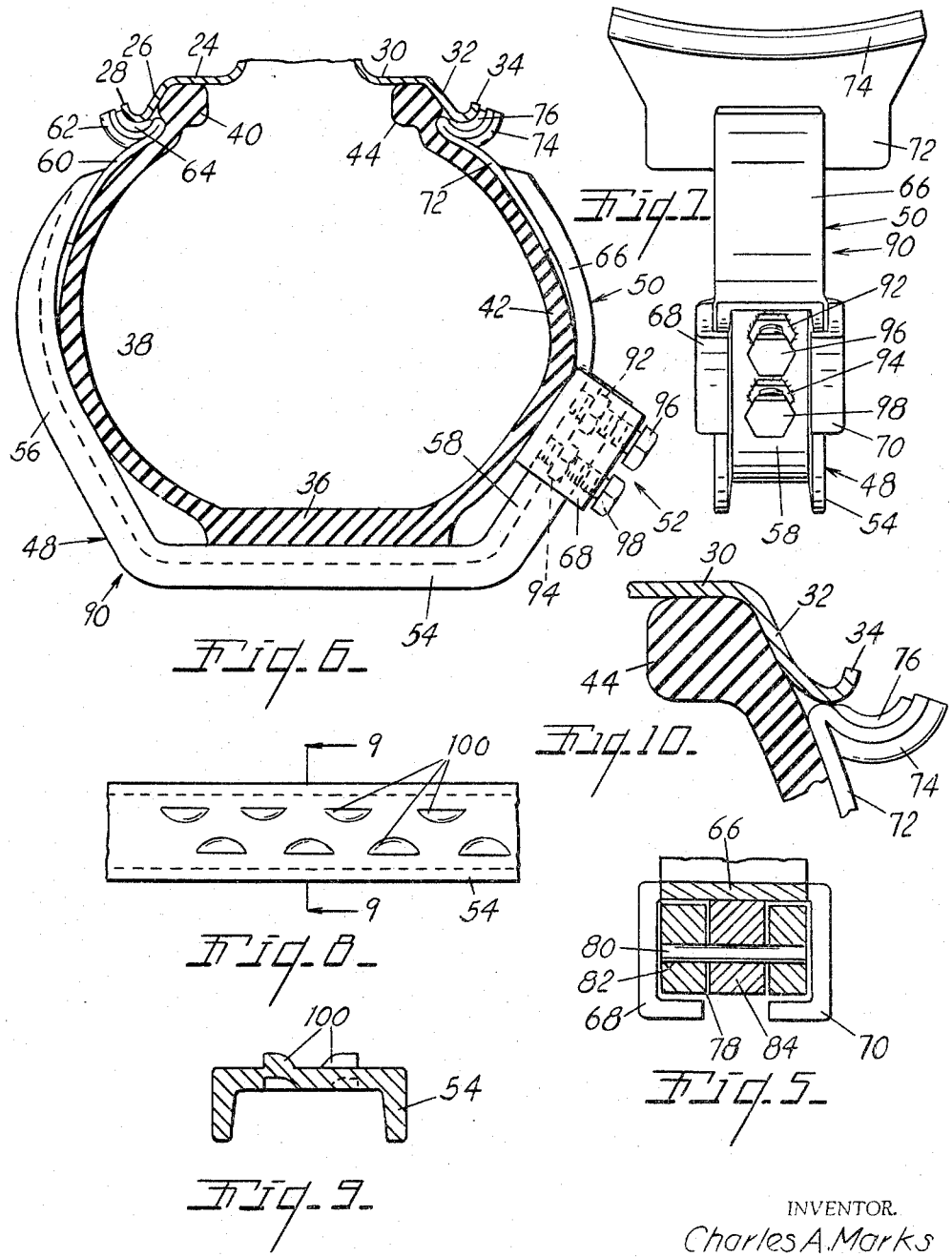

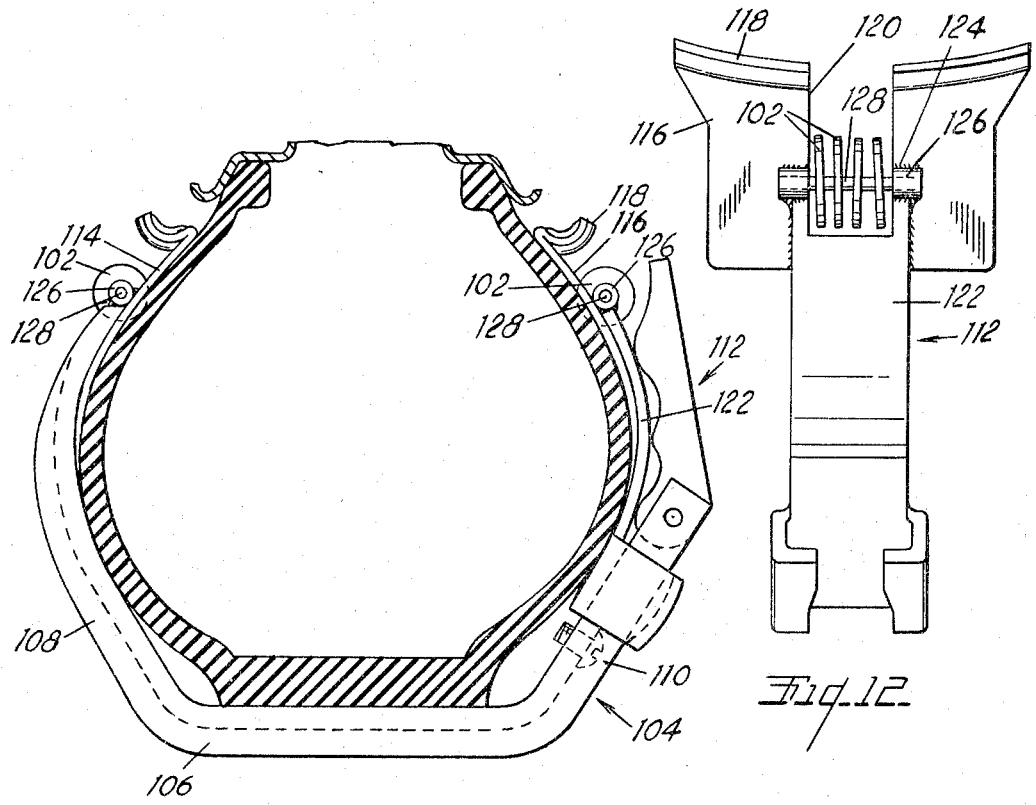
Fig. 11.
Fig. 12.
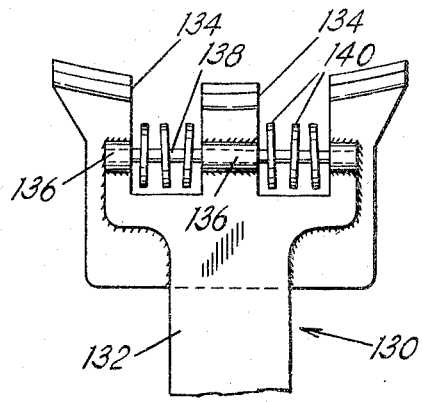
Fig. 13.
INVENTOR.
Charles A. Marks
BY
ATTORNEY.

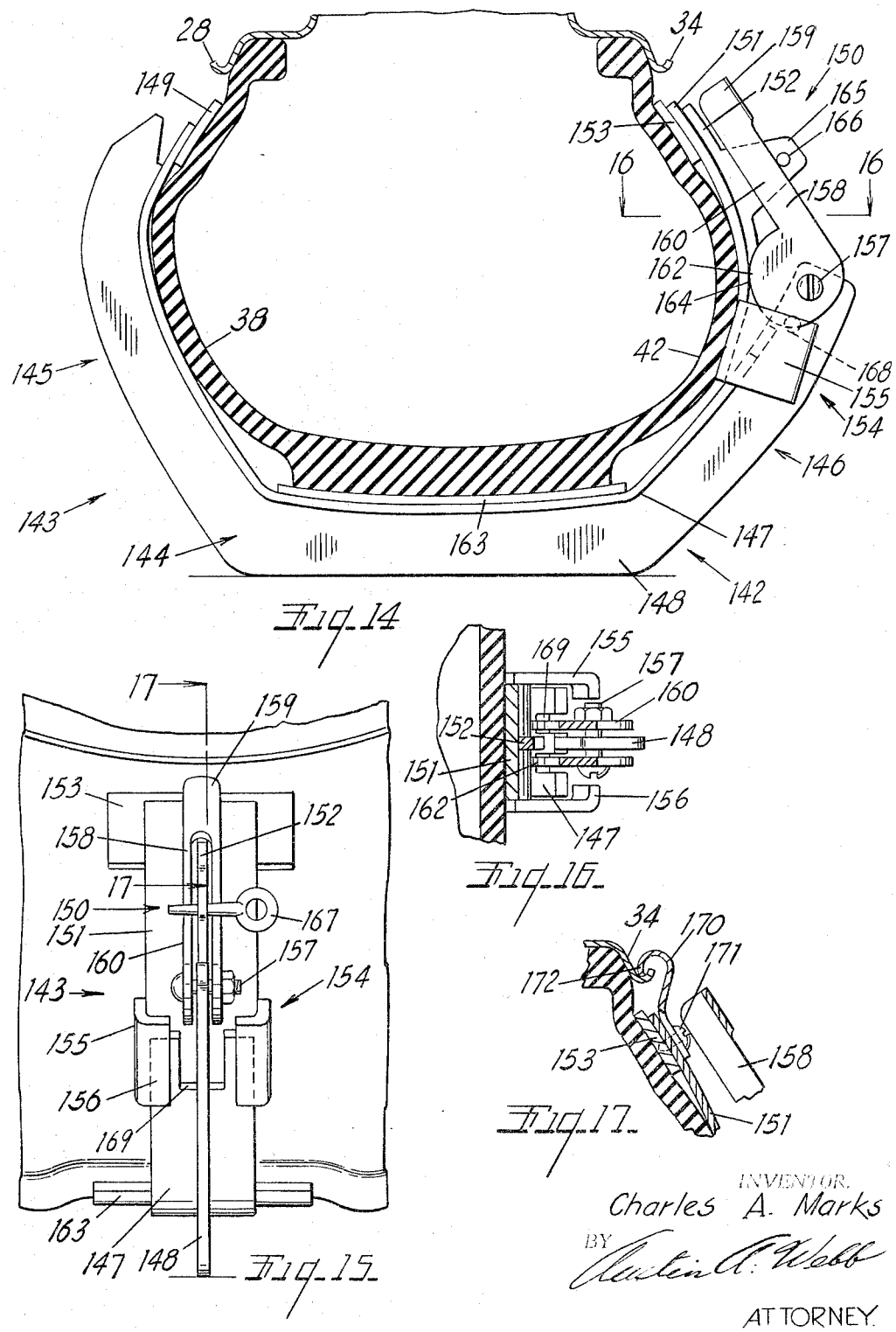

1

3,289,727
EMERGENCY TRACTION CLEAT FOR VEHICLES
Charles A. Marks, 1541 S. Main St., Elkhart, Ind.
Filed Apr. 13, 1966, Ser. No. 542,310
14 Claims. (Cl. 152—225)

This invention relates to an emergency traction cleat for vehicles.

This application is a continuation-in-part of my co-pending application, Serial No. 326,089, filed November 26, 1963, for Emergency Traction Cleat for Vehicles, now abandoned and of my copending application, Serial No. 426,313, filed on January 18, 1965, for Emergency Traction Cleat for Vehicles, now abandoned, and my copending application, Serial No. 465,303, filed June 21, 1965 for Emergency Traction Cleat for Vehicles, now abandoned.

The principal objects of this invention are:

First, to provide a traction cleat which has a clamping and wedging action resulting from rotation of the tire on which it is mounted;

Second, to provide a traction cleat which is easily mounted on a pneumatic tire of a vehicle without getting under or behind the vehicle, and which can be easily demounted;

Third, to provide a traction cleat which has simplicity of structure and economy of manufacture;

Fourth, to provide a traction cleat in which readily available and inexpensive channel or T-bar stock can be used for both the tire gripping part and the traction creating part of the cleat;

Fifth, to provide a traction cleat in which the circumferential, tire gripping adjustment of the cleat provides a radial wedging action which resists the action of centrifugal force to throw off the pneumatic tire; and Sixth, to provide a specific embodiment of a traction cleat in which the radial wedging action that clamps the cleat to the tire is produced by a cam lever that automatically locks in place.

Other objects and advantages of the invention are apparent from the following disclosure and claims.

The invention is described in relation to the drawings of which there are four sheets. In the drawings:

FIGURE 1 is a side elevational view of a vehicle drive wheel on which is a first, specific embodiment of the traction cleat of this invention;

FIGURE 2 is an enlarged view which has been taken as indicated by the section line 2—2 of FIGURE 1;

FIGURE 3 is an enlarged, outside, elevational view of the traction cleat illustrated in FIGURES 1 and 2;

FIGURE 4 is a sectional view similar to FIGURE 2, taken along the section line 4—4 in FIGURE 3;

FIGURE 5 is a cross sectional view of part of the cleat of FIGURES 1–3, taken along the section line 5—5 in FIGURE 3;

FIGURE 6 is a rear view of a second form of the cleat of the invention mounted on a vehicle drive wheel, and viewed as in FIGURE 2;

FIGURE 7 is an outside elevational view of the specific traction cleat of FIGURE 6;

FIGURE 8 is a plan view of the tread bridging portion of the traction cleat of FIGURE 6;

FIGURE 9 is a cross sectional view of the tread bridging portion of FIGURE 8, which view has been taken as indicated by the section line 9—9 in FIGURE 8; and FIGURE 10 is a rear view of part of the wheel rim and tire engaging structure of each embodiment of the cleat of the invention illustrated in FIGURES 1–9, which view illustrates the normal position of this part

2 relative to the wheel rim with the traction cleat in its preliminarily applied position prior to its being forced to its finally seated and clamped position by the weight of the vehicle as the wheel rolls over the cleat the first time;

FIGURE 11 is a cross sectional view similar to FIGURES 2 and 6 but showing a third modified form of cleat;

FIGURE 12 is an outside elevational view of a part of the cleat shown in FIGURE 11;

FIGURE 13 is a fragmentary outside elevational view similar to FIGURE 12 showing a modified version of the third form of the cleat of the invention;

FIGURE 14 is a cross sectional view similar to FIGURES 2, 6 and 11 but showing a fourth specific form of cleat;

FIGURE 15 is a fragmentary outside elevational view of the cleat shown in FIGURE 14 as applied to a tire;

FIGURE 16 is a fragmentary cross sectional view taken along the plane of the line 16—16 in FIGURE 14;

FIGURE 17 is a fragmentary cross sectional view taken along the plane of the line 17—17 in FIGURE 15 but showing a possible variation of the fourth specific form of the cleat.

All forms and variations of the cleat illustrated are practical insofar as the easy application and traction creating ability of the cleats of the invention are concerned. The differences between the forms affect mainly the manufacturing and tooling expense of making the cleats. The forms of the cleat shown in FIGURES 17, 14 and 11 are designated in that order as being somewhat preferred over other forms of the cleat, insofar as the grip of the cleat on the tire, and then resistance to being thrown off by centrifugal force are concerned.

In greater detail, FIGURE 1 illustrates a drive wheel 20 of an automobile, 21 illustrates part of a fender of the vehicle and the drive wheel comprises a wheel rim with an inflated pneumatic tire 22 thereon.

The wheel rim comprises an inner or back, tire bead bearing, cylindrical surface or ring portion 24 with a radially outwardly extending (relative to the axis of rotation of the wheel), annular, back, tire bead overlapping, flange portion 26 at the outer end of which is an annular, back lip or tire retaining bead 28. The wheel rim also comprises an outer or front, tire bead bearing, cylindrical surface or ring portion 30 with a radially outwardly extending (relative to the axis of rotation of the wheel), annular, front, tire bead overlapping, flange portion 32 having at its outer end an annular, front lip or tire retaining bead 34.

The pneumatic tire 22 is of conventional structure, comprising a circumferential or peripheral, thickened, tread portion 36, on the inner or back side of the tread portion a back, annular side wall 38 which terminates in an annular bead 40 and on the front side of the tread portion 36 an outer or front, annular side wall 42 which terminates in an annular bead 44. With the pneumatic tire mounted and inflated to the proper air pressure, the side walls 38 and 42 are convexly bulged or curved as shown in FIGURE 2.

In accordance with this invention, the tire 22 in FIGURES 1–2 has mounted thereon a first, specific embodiment 46 of the traction cleat of this invention.

All embodiments 46, 90, 104 and 142 of the traction cleat of this invention (shown in FIGURES 2, 6, 11 and 14) comprise a lug member, a clamp arm member and connecting means for releasably connecting the clamp arm member to the lug member against lateral and angular displacement.

The lug member 48 in the first and second embodiments in FIGURES 2 and 6 comprises a rigid bar having generally the cross sectional shape of a channel with the legs thereof facing outwardly (see FIGURES 3 and 9). Longitudinally (see FIGURES 2 and 6) the bar has an elongated tread bridging and engaging lug portion 54, an inner connecting or back strap portion 56 and an outer or front stub portion 58.

The back strap portion 56 is disposed generally at an obtuse angle to the lug portion 54, but generally in alignment with the inwardly or tread facing side of the lug portion 54. The strap portion 56 is a tire side wall embracing portion. It is generally concavely bowed on the side thereof (the front, bowed, tire embracing side) normally facing the back side wall 38 of the tire 22. At its other end the back strap portion 56 is connected as by weldment to a flanged spanner plate or pad 60. The spanner plate 60 provides a surface transversely disposed relative to said lug portion 54, which surface conforms generally to, and normally bears against, the back side wall 38 of the tire 22. The spanner plate or pad 60 is transversely elongated relative to the back strap portion 56 of the lug member 48. At the end of the spanner plate 60, that normally faces the back lip 28 of the wheel rim, there is an outwardly or backwardly extending flange 62 having a surface which normally faces and is adjacent the annular, back lip 28 of the wheel rim. This surface, transversely relative to the back strap portion 56, has a concave curvature with a radius approximately that of the convex curvature of the wheel rim back lip 28. In addition, this surface longitudinally relative to the lug member 48 has a concave curvature. Covering this surface and secured thereto as by a suitable adhesive is a layer 64 of friction material such as, for example, material employed as brake lining, and the like.

The front stub portion 58 of the lug member 48 is disposed generally at an obtuse angle to the lug portion 54, but generally in alignment with the inwardly or tread facing side of the lug portion and with the back strap portion 56. The stub portion at its inner end is joined to the lug portion 54 and extends away from the back strap portion 56 and outwardly or frontwardly (relative to the tire) at an obtuse angle relative to the lug portion 54, which is slightly greater than the obtuse angle between the back strap portion 56 and lug portion 54, in order to accommodate the clamp arm member 50.

The clamp arm member 50 in both embodiments comprises a rigid, metal front strap portion of preferably flat bar stock, which is generally concavely bowed on the inner side thereof, that is, the side which normally faces the front side wall 42 of the tire 22. The radially outer end (relative to the wheel axis) of the front strap portion 66 is disposed adjacent the inner side of said stub portion 58 of the lug member 48. In the region of said radially outer end of the front strap portion 66 are a pair of frontwardly extending, oppositely facing, L-shaped bars 68 and 70. (See FIGURES 3 and 5.) The long leg of one L bar 68 is connected as by weldment to one side of the front strap portion 66 while the long leg of the other bar 70 is connected as by weldment to the other side of the front strap portion 66. The long legs are spaced sufficiently from one another so as to accommodate therebetween in sliding fit the width of the stub portion 58. The short legs of the L bars 68 and 70 face each other and overlap the corresponding outwardly or frontwardly facing legs of the stub portion 58 of the lug member 48. There is a substantial amount of "play" or space between the short legs of the L bars 68 and 70 and the outer ends of these frontwardly facing legs of the stub portion 58 (see FIGS. 5 and 7). The other or radially inner end (relative to the wheel axis) of said front strap portion 66 is joined to a flanged spanner plate or pad 72 (see FIGURES 3 and 6). The spanner plate 72 provides a surface normally transversely disposed relative to said stub portion 58, when the clamp arm member 50 is in a normal position on the tire, which surface conforms generally to, and bears against, the front side wall 42 of the tire 22. The spanner plate 72 is transversely elongated relative to the front strap portion 66. At the end of the spanner plate 72, the normally faces the front lip 34 of the wheel rim, there is an outwardly or frontwardly extending flange 74 which provides a surface that normally faces the front lip 34 of the wheel rim, that transversely (relative to the front strap portion 66) has a concave curvature with a radius approximately that of the convex curvature of the front lip, and that longitudinally (relative to the lug member 48) has a concave curvature (see FIGURE 2). Covering this surface and secured thereto as by a suitable adhesive is a layer 76 of friction material such as that employed in the layer 64 on the spanner plate 60 on the lug member 48.

The clamp arm member 50 in each embodiment is releasably connected to the stub portion 58 of the lug member 48 by the connecting means 52. The connecting means 52 in each embodiment with the embodiment in proper position on a drive wheel 20 cause the clamp arm member 50 and the back strap portion 56 of the lug member 48 to clamp the cleat to the tire 22 with the layers 64 and 76 of friction material and the underlying surfaces provided by the spanner plates or pads 60 and 72 being seated under, and bearing against, the corresponding back and front lips or beads 34 and 40 of the wheel rim. The two specific embodiments illustrated in the drawings differ structurally in the connecting means 52.

In the embodiment 46 of the traction cleat shown in FIGURES 1-5, the connecting means 52 can be described generally as a cam-lever lock. In this embodiment, the outer or front end of the stub portion 58 of the lug member 48 is bifurcated, whereby there is provided a slot 78. Pivotally mounted in the slot 78 on a pivot pin 80 disposed in friction fit in a transverse bore 82 through the bifurcated end of the stub portion 58 is a cam head 84 of a lever arm 86. The cam head has a flat or retracted, peripheral surface portion which, when the lever arm 86 is in its outermost position as shown in dashed lines in FIGURE 2, either is within the slot 78 or projects inwardly only slightly from the slot 78 so that the front strap portion 66 and L-bars 68 and 70 can slide freely over the outer end of the stub portion 58. The cam head 84, in addition, has a peripheral surface portion of gradually increasing diameter, which surface portion is referred to as the eccentric or peak surface portion. As the lever arm 86 is swung inwardly towards the clamp arm member 50 to within a short distance of the front strap portion 66 thereof, the eccentric surface portion bears against the front facing surface of the front strap portion 66 and thrusts the front strap portion 66 inwardly. Adjacent and beyond the peak surface portion of the cam head 84 is a somewhat radially retracted surface portion which, when the lever arm 86 is swung all the way inwardly into abutment with the front strap portion 66, that is, into lock position, normally bears against the front strap portion 66 instead of the peak of the eccentric surface portion. Hence, when the lever arm 86 is swung inwardly to lock position, it tends to snap into lock position and it is automatically locked in place by the pressure of the tire acting outwardly through the clamp arm member 50 against the cam head 84 just beyond its peak. Bearing of the lever arm 86 against the clamp arm member 50 prevents the cam head 84 and lever arm 86 from rotating further beyond the peak along the recessed surface of the cam head 84. Bulging of the side walls of the tire 22 as the tire and cleat engage the ground and support the weight of the vehicle creates forces acting outwardly through the clamp arm member 50 and thus to the lever arm 86, whereby a torque is placed on the cam head 84, which tends to turn the cam head surface bearing against the clamp arm member 50 from the recessed surface portion to the peak of the eccentric surface portion and thereby thrust the clamp arm member 50 inwardly. Hence, bulging of the side walls of the tire 22 merely causes the cleat to clamp tighter to the tire and this occurs just when maximum clamping of the cleat to the tire is normally wanted.

Preferably, the lever arm 86 has a raised portion which bears against the front surface of the front strap portion 66 when the lever arm 86 is in its locked position. A purpose of this raised portion is to provide space between the outer end of the lever arm and the front surface of the front strap portion 66 for a screw driver, tire iron or the like, which usually is employed to wedge or pry the outer end of the lever arm 86 outwardly until the peak surface of the cam head 84 has been passed so that the cleat assembly can be removed.

Because of the play between the short legs of the L bars 68 and 70 and the outwardly extending flanges of the stub portion 58, when the clamp arm member 50 is in position on the stub portion 58 and the lever arm 86 is swung from its outermost position inwardly towards the clamp arm member 50, the action of the cam head 84 causes the clamp arm member 50 to first pivot inwardly a small distance. The pivot point or fulcrum for the pivotal action of the clamp arm member 50 is the radially outer (relative to the wheel axis) end of the front strap portion 66, as shown in FIGURE 4, bearing against the inner side of the stub portion 58. Because of this pivotal action on the part of the clamp arm member 50, when the traction cleat 46 of this invention is applied to a wheel, the back spanner plate or pad 60 of the back or inner strap portion 56 is positioned so that the layer 64 of friction material is positioned near the corresponding back lip 28 of the wheel rim while the clamp arm member 50 is positioned on the stub portion 58 so that the front spanner plate or pad 72 is disposed with the layer 76 of friction material near the annular front lip or bead 34 of the wheel rim as shown by dashed lines in FIGURE 2. When the lever arm 86 is swung inwardly into locked position, the slight inward pivot of the clamp arm member 50 causes the front spanner plate or pad 72 to clampingly bear against the front side wall 42 of the tire adjacent the front, tire bead 40 as shown in FIGURE 10, and the back spanner plate or pad 60 to clampingly bear against the back side wall 38 of the tire. When the wheel rotates the cleat into ground engagement the tire side walls bulge and the spanner plates or pads are thrust towards each other, and the flanges 62 and 74 are impelled into position under the corresponding lips or rim beads 28 and 24 so that the corresponding lips or beads are seated on the layers 64 and 76 on the flanges 20 as shown in FIGURE 2.

Preferably, in the embodiment of FIGURES 1–5, the stub portion 58 on the inner side thereof comprises a detent positioned between the end of the slot 78 provided by the bifurcated, outer end of the stub portion 58 and the inner end of the stub portion 58 which is joined to the tread bridging lug portion 54 of the lug member 48. This detent limits the extent to which the clamp arm member 50 can be slid radially outwardly over the stub portion 58. The detent is positioned so that the outer side of the clamp arm member 50 is always within the path of movement of the peak surface portion of the cam head 84 when the traction cleat is mounted on a proper sided tire. In the embodiment shown, this detent is the shank of a screw 88, threadedly mounted through a hole in the stub portion 58. The radial inward movement of the tread bridging lug portion 58 when bearing the load of the tire, moves detent or stop 88 toward or against the radially outer end of front strap portion 66. The pivot 80 and cam head 84 being carried by the stub portion 58, move correspondingly radially inwardly along the radially outer end of strap 66, which is inclined radially inwardly and axially outwardly of the tire at this point. This further tightens the grip of the cleat assembly on the tire. The frontward or axially outward pressure of the bulging side wall 42 of the tire, acting through the strap 66 and cam head 84, tends to flex the stub portion 58 forwardly or axially outwardly until the outer edge of the flange portions of the stub engage the overlying inner edges of the short legs 68 and 70 as is shown in FIGURE 4.

The specific traction cleat 46 of FIGURES 1–5 can be removed by pulling or prying with a screw driver or a taper edge tool the lever arm 86 away from the clamp arm member 50, and outwardly swinging the lever arm 86 to the dashed line position shown in FIGURE 2.

The connecting means in the specific embodiment 90 of the traction cleat of this invention, which is shown in FIGURES 6 and 7, comprises basically the same structure as far as the clamp arm member 50 is concerned. In this embodiment, however, the end of the stub portion 58 is not bifurcated. Instead, in the region where the slot 78 is in the embodiment of FIGURES 1–5, there are two longitudinally aligned bores with threaded nuts 92 and 94 secured as by weldment to the outwardly or front facing surface of the web of the stub portion 58, which threaded nuts 92 and 94 are in coaxial alignment with the bores. Threadedly engaged with the nuts and disposed through the bores are cap screws 96 and 98, the heads of which are located on the front side of the stub portion 58. Preferably the screws 96 and 98 are provided with hex heads of the same standard size as wheel lug nuts of automotive vehicles. With the clamp arm member 50 in position on the stub portion 58, the cap screws 96 and 98 are turned until the short legs of the L bars 68 and 70 on the front strap portion 66 of the clamp arm member 50 bear tightly against the front side of the stub portion 58 and in effect clamp the clamp arm member 50 to the stub portion 58.

The specific embodiment 90 of the traction cleat illustrated in FIGURES 6–7 is applied to a vehicle drive wheel in much the same fashion as the embodiment of FIGURES 1–5. In other words, with the clamp arm member 50 removed from the stub portion 58, the lug member 48 is placed onto a wheel with the back spanner plate or pad 60 of the lug member 48 positioned adjacent the corresponding back side wall 38 with the spanner plate flange 62 adjacent the back, annular lips or rim bead 28. The clamp arm member 50 is then slid over the stub portion 58 until front spanner plate 72 is placed adjacent the front sidewall 42 with the spanner plate flange 74 adjacent the front annular lip or rim bead 34. The inner and outer cap screws 96 and 98 on the stub portion 58 are then tightened down, resulting in the spanner plates or pads 60 and 72 clamping the cleat 90 to the tire with the spanner plate flanges being adjacent the corresponding lips or rim beads. When the wheel brings the cleat 90 into ground engagement, the weight of the vehicle causes the tire sidewalls at the cleat to bulge outwardly causing the cleat to grip the tire more tightly. This causes spanner plate flanges 62 and 74 to be seated underneath the corresponding wheel rim beads 28 and 34 and the rim beads to bear against the layers 64 and 76 of friction material as shown in FIGURE 6.

To remove the specific embodiment 90 of traction cleat shown in FIGURES 6 and 7, the cap screws 96 and 98 are turned back so as to release the clamp arm member 50 from the stub portion 58.

A feature of advantage of the traction cleat of the first two forms of the invention is that when it is mounted on a wheel, as the wheel rotates the traction cleat around to and in engagement with the ground or road, the weight of the vehicle applied through the wheel to the tire and thus the traction cleat tends to bulge the tire so that the cleat is gripped more tightly to the tire and does not slip on the tire as it imparts traction between the tire and the road surface. The spanner plates or pads on the rigid, sidewall embracing straps, due to their engagement with the wheel rim beads, prevent misalignment or twisting of the straps relative to the tread bridging lug portion of the cleat whereby the cleat remains in securely clamped, radial position on the tire. As the wheel rotates the cleat past road engaging position, there is a possibility that the wheel may tend to speed up as the surface of the tire comes into low friction engagement with the ground or road surface, thus increasing the centrifugal forces at the circumference of the tire. Such forces may tend to throw the tread bridging lug portion radially (relative to the wheel axis) outwardly from the tread 36 but because of the engagement between the clamp arm member 50 and the stub portion 58 of the lug member 48, especially with the embodiment of FIGURES 1–5, the centrifugal forces merely cause the cleat to grip tighter to the tire until the cleat again comes into contact with the ground or road surface.

Under extreme conditions, however, it may be desirable to minimize slippage between the tread bridging lug portion 54 fo the cleat and the tread 36 of the tire, particularly in the case of the embodiment of FIGURES 6 and 7. Accordingly, for such conditions there can be employed a tread bridging lug portion 54 on the inside surface of which are projections 100 which intermesh with the tire tread 36.

It may be found, particularly when applying one of the forms, lugs or cleats heretofore, described to a new tire with a thick tread or in applying a lug to a tire larger than that for which it was designed, that the rim engaging flanges 62 and 74 will not move into contact with the beads 28 and 34 on the wheel rim as shown in FIGURES 2 and 6. In order to prevent angular twisting of the lug or cleat, relative to a radial plane from the axis of the wheel, the modified forms of the cleat shown in FIGURES 11, 12 and 13 provide additional holding elements in the form of loosely mounted discs 102. Note that these discs will function independently of, or in assistance to the arcuate flanges on the cleat.

In FIGURE 11 there is illustrated a modified lug assembly 104 which has a similar lug or tread bridging portion 106, back strap portion 108, front stub portion 110, and clamp arm member 112 as the other forms of the cleat. The back strap position and the clamp arm have modified spanner plates or pads 114 and 116 respectively which are reversely opposed to each other on opposite sides of the tire. As appears most clearly in FIGURE 12, the spanner plate 116 and its arcuate flange 118 are notched downwardly, or radially outwardly of the wheel at 120. The back spanner plate is notched the same. The notch extends into strap portion 122 of the front clamp arm member. Secured by welding at 124 to the spanner plate and strap portion are spaced sleeves 126 which support a pin 128 that bridges the notch 120. Freely tiltably and rotatably mounted on the pin 128 within the notch are a plurality (four being illustrated) of the circular metal discs 102 having relatively sharp squared edges. The discs are of a diameter to extend beyond the inner or tire engaging face of the spanner plate. When the cleat is applied to the tire and the clamp arm member 112 is tightened, the inner edges of these discs are pressed into the flexible side wall of the tire. The penetration is by flexing of the surface of the tire, not by cutting of the rubber, but the discs grip the tire and resist angular twisting of the cleat relative to a radius of the wheel.

Note that the gripping action of the discs 102 coacts with the gripping action of the projections 100 on the upper or inner side of the tread bridging portion 106 (not shown in FIGURE 11 but appearing in FIGURES 8 and 9) in assisting the clamping action of the spanner plates 114 and 116, and the arcuate flanges 118 in resisting angular displacement of the cleat which might tear the cleat off of the tire under heavy load. The discs 102 being tiltable on the pins 128, twist to function equally well whether the wheel is being driven forwardly or backwardly.

The structure shown in FIGURE 13 is a further modification of that shown in FIGURES 11 and 12. The clamp arm member 130 has its strap portion 132 widened at its upper end. Both the strap portion and the spanner plate are notched at spaced intervals at 134. Short sleeve sections 136 welded to the ends of the strap portion and the spanner plate support a pin 138 and a plurality (three being illustrated) of discs 140 are freely tiltably mounted on the pin within the notches. As in FIGURES 11 and 12 the discs project through the inner faces of the spanner plate to engage the tire. It will be understood that the back or inner strap portion and spanner plate (not illustrated in FIGURE 13) will have similar and opposed discs. This modification spaces the groups of discs angularly around the wheel so that the cleat has gripping engagement with the tire at triangularly spaced points, from the tread engaging projections 100 to each group of discs and across the base of the triangle between the groups of discs.

The cleat 142 shown in FIGURES 14 to 17 has a lug member generally indicated at 143 and consisting of tread bridging lug portion 144 integrally formed with an inner or back connecting strap 145. At its front or outer end, the lug portion 144 has an integral upturned front end or stub portion 146 that is somewhat longer than the corresponding ends 58 and 104, extending to or somewhat beyond the extreme bulge of the tire side. The lug portion 144, back strap 145 and front end 146 are formed of T bar stock with a crosspiece 147 extending tangentially of the tire, and a stem section 148 that extends in a radial plane of the tire. The stem section forms the road engaging element of the cleat across the tread portion 144 and stiffens the back arm 145 and the front arm or end 146.

Secured transversely across the radially inner end of back arm by being welded to the face of the cross portion 147 is a side wall engaging plate or pad 149. This engages the side wall 38 of the tire radially inwardly of the side bulge of the tire and adjacent to the bead 28 of the wheel rim.

The clamp member arm indicated generally at 150 is an axially bowed strip of metal 151 with an outer reinforcing rib 152. A tire side wall engaging pad 153 is welded to the radially inner end of the clamp arm. As in the embodiment shown in FIGURES 2 and 11, the clamp arm has a connection 154 to the stub end of the cleat portion that includes side plates 155 welded to the sides of the strip 151 with inwardly turned flanges 156 on their outer ends. The side plates fit slidably over the edges of the cross portion 147 of the outer stub end of the cleat.

The end of the stem section 148 has a hole formed therethrough for passing the pivot bolt 157 that pivotally connects the cam lever 158 to the upstanding end 146 of the cleat. The lever 158 is bifurcated being formed of a folded metal handle 159 with spaced sides 160. A slot 161 in the handle clears the projecting flanges 148 and 152. The sides of the lever have cam portions 162 eccentric to the pivot 157.

Fixedly secured across the radially inner side of the tread bridging portion 144 is a generally flat plate 163 that projects substantially beyond the sides of the cross portion 147 of the T-section of the cleat. The plate 163 contacts a substantially greater peripheral portion of the tire tread 36 than the cross portion of the cleat and when the cleat assembly is clamped to the tire this wider base of engagement resists twisting of the cleat from a radial plane of the tire. As in FIGURES 2 and 11, the cleat is clamped to the tire by pressing the lever 158 axially and radially inwardly of the tire and the clamp arm 150 until the eccentric peak 164 of the cam portions 162 is passed in axially compressing contact with the strap 151 of the clamp arm.

An ear 165 projecting outwardly from the rib 152 projects through the slot between the side portions of the cam lever and has a hole 166 therein adapted to receive a retaining pin 167 (see FIGURE 15) if desired.

The projecting base portion 147 of the cleat has a second hole 168 (see FIGURE 14) for alternative mounting of the pivot 157 and the cam lever 158 on smaller or worn tires. When the cam lever is mounted in this position, the cam portions 162 are moved radially outwardly and the cross portion 147 of the cleat cross section is notched as at 169 so that the cams may coact with the strap 151 of the clamp arm.

FIGURE 17 shows a variation of the cleat and clamp arm of FIGURES 14 to 16. A flexible curved spring 170 of transversely flat material is secured to the strap 151 of the clamp arm by screws 171. A hooked end 172 of the curved spring engages over the curved bead 34 of the tire rim to resist the action of centrifugal force tending to throw the clamp off of the tire. At the same time, the yieldable curve of the spring does not seriously interfere with the clamping of the cleat to the tire. It will be understood that a similar retaining spring is secured to the back tire engaging arm 145 of the cleat for engagement over the rim bead 28.

Other features, advantages and specific embodiments of this invention will be readily apparent to those in the exercise of ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What is claimed as new is:

1. An emergency traction cleat for a pneumatic tire having a circumferential tread, a convexly bulged, annular back side wall and a convexly bulged, annular front side wall which comprises:
   a lug member comprising a tread bridging portion,
   a back tire side wall embracing arm portion disposed generally at an obtuse angle to, and generally in alignment with said tread engaging side of said lug portion,
   said arm portion being concavely bowed on the side thereof normally facing the back side of the tire and being fixedly connected to said lug portion,
   a stub portion disposed at an obtuse angle to and generally in alignment with said tread engaging side of said lug portion but opposite to said arm portion and spaced from said arm portion,
   said stub portion being joined at one end to said lug portion,
   a clamp arm member which is generally concavely bowed on the side thereof normally facing the front, tire side wall with one end thereof disposed adjacent said stub portion of said lug member,
   said clamp arm member and said stub portion forming a front tire side wall embracing arm disposed oppositely to said back tire side wall embracing arm portion,
   and means releasably connecting said clamp arm member to said stub portion to interlock said clamp arm member and said stub portion against angular motion in the plane of the side of said tire while causing said clamp arm member and said back tire side wall embracing arm portion to clamp said cleat to said tire.

2. A cleat as defined in claim 1 in which said back tire side wall embracing arm and said clamp arm member have tire side wall engaging plates disposed at their radially inner ends and arranged and extending transversely beyond the edges of said arms.

3. A cleat as defined in claim 2 in which said side wall engaging plates have flanges on their radially inner edges that are curved arcuately in planes radial to the axis of the tire, and curved transversely and concavely inwardly to abut segments of rim beads on a wheel on which the tire is mounted.

4. A cleat as defined in claim 2 in which said connecting means are attached to said clamp arm member at the end thereof disposed adjacent said stub portion and slidingly overlapping said stub portion with the clamp arm member being on the inner side of said stub portion, and screw means threadedly mounted on said stub portion and passing through said stub portion to normally bear against said clamp arm member and urge said clamp arm member against the corresponding tire side wall when tightened down.

5. A cleat as defined in claim 2 in which said tread bridging portion has a tread engaging plate secured to its radially inner side and extending transversely thereof over a substantially wider segment of the periphery of said tire than the width of the tread bridging portion.

6. A cleat as defined in claim 2 in which said tire side wall embracing plates have openings formed therein,
   pivot pins secured in spanning relation to said openings,
   and discs loosely supported on said pivot pins and having their peripheries projecting beyond the axially inner tire engaging surfaces of said plates.

7. A cleat as defined in claim 2 in which said tread bridging portion has tread engaging projections formed on its tread engaging side.

8. A cleat as defined in claim 7 in which said connecting means between said stub portion of said lug member and said clamp arm member comprises a lever pivoted on one of said members,
   and a cam head on said lever having a surface eccentric to the pivot of the lever and engageable with the other of the two members to swing said clamp arm member axially inwardly into gripping engagement with the outer side of said tire.

9. A cleat as defined in claim 8 in which said lever is swingable in the plane of said lug member.

10. A cleat as defined in claim 2 in which said connecting means comprise side members on the radially outer end of said clamp arm slidably engageable with the lateral edges of said stub portion,
    and a lever arm pivotally connected to the radially inner end of said stub portion and having a cam head clampingly engageable with said clamp arm when said lever arm is swung radially and axially inwardly of said tire.

11. A cleat at defined in claim 10 in which said tread bridging lug portion and said stub portion have channel-shaped cross section with radially and axially outwardly facing flanges,
    said lever being pivoted to the flanges on said stub portion and the web of the channel section being cut away to expose the adjacent part of said clamp arm member to the cam head on said lever.

12. A cleat as defined in claim 10 in which said tread bridging portion has a tread engaging plate secured to its radially inner side and extending transversely thereof over a substantially wider segment of the periphery of said tire than the width of the tread bridging portion.

13. A cleat as defined in claim 12 in which said tread bridging portion and said stub portion are of T-shaped cross section with the cross piece of the T disposed generally parallel to the surface of the tire and the base of the T projecting outwardly from the tire.

14. A cleat as defined in claim 12 in which said tire side wall engaging arms have radially inwardly projecting plates of springable material secured to their inner ends, said plates having oppositely axially curved hooked ends engageable over the edge beads on a wheel rim.

No references cited.

ARTHUR L. LA POINT, *Primary Examiner.*

C. W. HAEFELE, *Assistant Examiner.*